Patented July 9, 1935

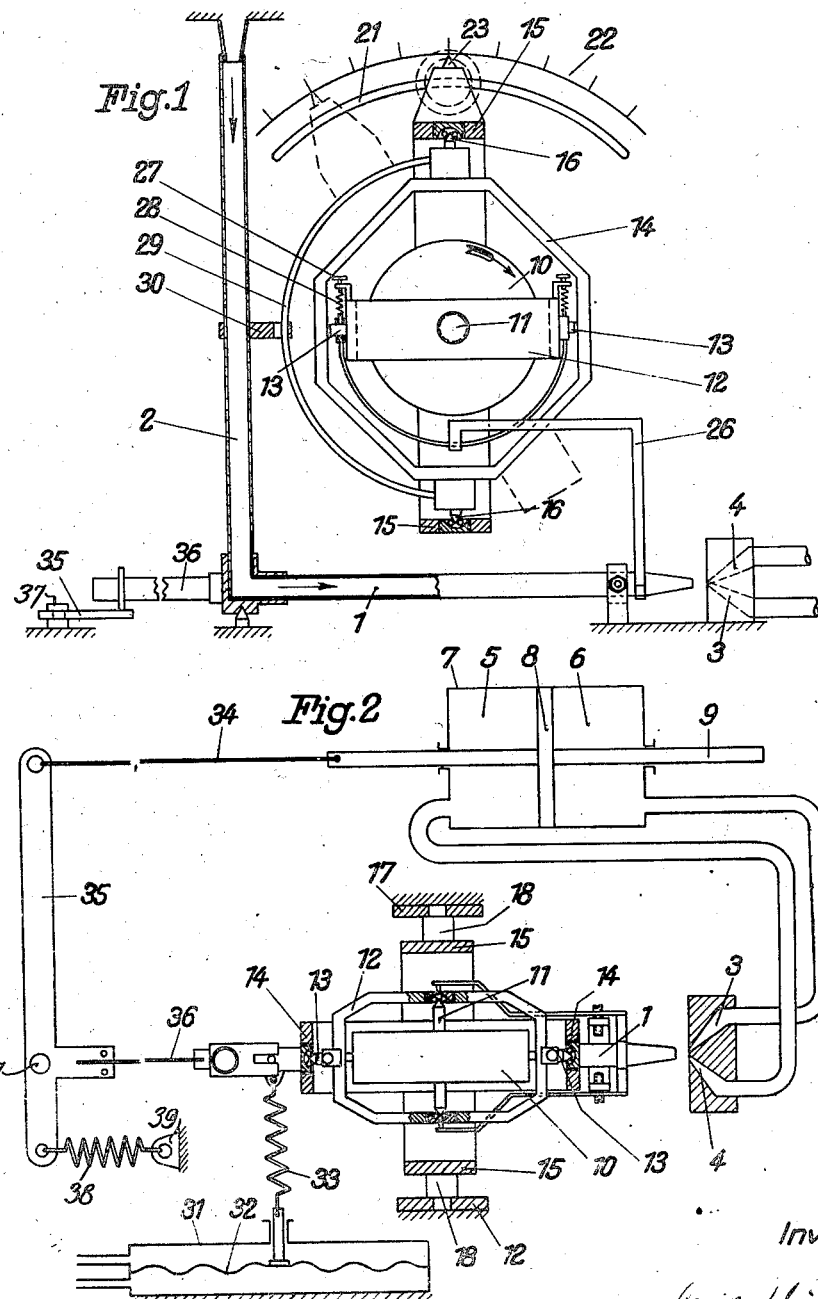

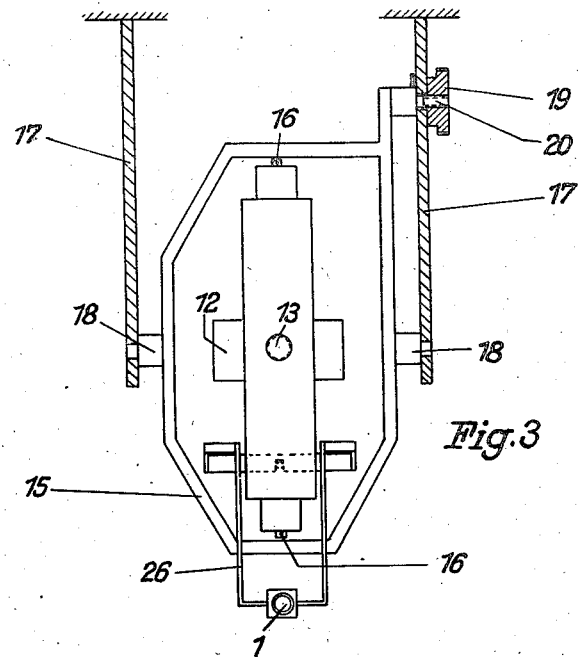
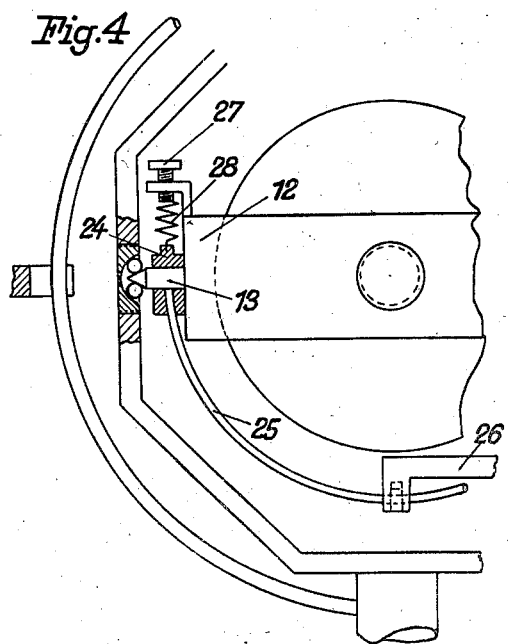
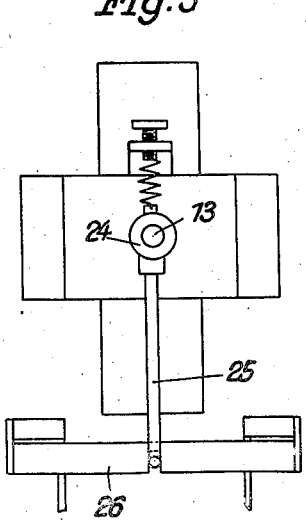

2,007,515

UNITED STATES PATENT OFFICE 2,007,515

METHOD OF AND APPARATUS FOR AUTOMATIC AIRCRAFT-CONTROL

Guido Wünsch, Berlin-Steglitz, and Waldemar Möller, Berlin-Zehlendorf, Germany, assignors to Askania-Werke Aktiengesellschaft, vormals Centralwerkstatt Dessau und Carl Bamberg Friedenau, Berlin-Friedenau, Germany, a corporation of Germany Application March 29, 1933, Serial No. 663,394
In Germany March 30, 1932

17 Claims.  (Cl. 244—29)

This invention relates to the control of air or other craft, vessels etc.

One of the objects of the invention is to provide a method of and apparatus for automatically controlling the flight of aircraft, whereby the aircraft of whatever nature and whether stable or unstable will be surely and accurately steered upon its course, free from disturbing pendulating motions and in any weather even the most squally.

By stable aircraft are meant those which are in stable equilibrium relative to the axis about which the steering is effected, that is to say for steering a course relative to the transverse axis.

By unstable aircraft are meant those which are in unstable equilibrium relative to the axis about which the steering is effected and which therefore require a continuous handling or operation of the rudder or other steering means in order to keep them in the desired position of flight or on the desired course.

Other objects of the invention will appear from the following description.

The invention and its aims and objects will be clearly understood from the following description of our novel method and of one illustrative form of apparatus for carrying out the same and illustrated in the accompanying drawings, the true scope of the invention being more particularly pointed out in the appended claims.

In the drawings:

Fig. 1 shows diagrammatically in elevation one illustrative form of apparatus for carrying out the invention, certain parts being shown in section.

Fig. 2 shows diagrammatically a sectional top plan view of the apparatus shown in Fig. 1.

Figs. 3, 4 and 5 show details of the journaling of the different shafts and of the connection of the precession frame and acceleration frame with the power supplying means.

Heretofore it has been proposed to effect an automatic steering of air and other craft by subjecting the rudder or other steering device operating means to the action of a force dependent upon the deviation from the true course and controlled by a direction indicating device for example, as well as to another force or influence dependent upon the speed of turning of the aircraft and controlled for example by a precession gyroscope. Such an arrangement will suffice to keep an aircraft of the stable variety substantially upon a true course when the air is calm or when its movement is uniform, but it will not accomplish this result even in the case of stable aircraft in unsettled or squally weather, nor will it accomplish this result in the case of unstable aircraft in any weather, even the calmest.

In accordance with the present invention there is caused to act upon the steering means, in addition to a force or influence dependent on the deviation from the true course and to a force or influence dependent on the turning speed, a further force dependent on the angular acceleration or turning acceleration. These forces or influences may be produced by any suitable means without departing from the scope of the invention, thus the force dependent on the deviation from the true course may be produced by a direction indicator while the force dependent on the speed of rotation may be derived from a precessional gyroscope while the force dependent on the angular acceleration may be derived from the pressure produced in the bearings of a turning indicator gyroscope when said gyroscope precesses.

In accordance with the invention also a fourth force or impulse in the nature of a return impulse dependent on the position of the rudder as and for the purpose hereinafter more fully described, may be caused to act upon the steering means.

As the angular acceleration is proportional to the force producing the angular or turning movement, it will be clear that by the addition of said force dependent on the angular acceleration, whenever there occurs an exterior disturbing force capable of producing a turning movement of the aircraft, the rudder will be immediately and simultaneously moved or adjusted to an angle corresponding to said disturbing force. Hereby, however, there will be simultaneously induced a corresponding counter or return steering force which acts in opposition to said exterior disturbing force. Any inclination of the aircraft axis in question to deviate from the true course is thereby stifled in its very inception.

By the use in accordance with our invention of a force or influence corresponding to the angular acceleration as an additional influence or impulse in a control responding to angular speed and angular deviation, a control is obtained founded upon the cooperation of three forces or influences, of which the first is dependent upon angular acceleration, the second on angular speed and the third on the size of the angle itself. Such a control will maintain aircraft, even unstable aircraft, on the true course even in squally weather and without material pendulating movements.

For putting into effect the force or influence dependent upon the turning speed it is preferable to use so-called turning indicator gyroscopes. These are gyroscopes provided with two degrees of freedom, which are journaled in a precessional frame or housing which in turn is suspended for swinging movement about an axis, the precession axis perpendicular to the axis of rotation of the gyroscope. The arrangement is such that the precession axis and gyroscope axis when at rest are perpendicular to that axis relative to which the control or steering is effected. Such a gyroscope can be used to advantage in accordance with the invention for the release of the force or influence dependent upon the angular acceleration. When a gyroscope makes a precessional movement there is created in the bearings of the precession axis a pressure which is proportional to the change or variation in the precessional force. As however the precessional force of a gyroscope is proportional to the angular speed, the speed or rate of change of said precessional force will be proportional to the angular acceleration. This applies therefore to the pressure created in the bearings of the precession axis. If, therefore, in addition to the forces acting upon the power supplying or controlling means for the rudder motor or operating means and which are derived from the stroke of a direction indicator and the precessional movement of a gyroscope or other angular speed measuring means, a further force or influence dependent upon the pressure created in the precessional bearings of a precessional gyroscope be caused to act upon said power-controlling means, said power-controlling means will immediately set the rudder motor or other rudder actuating means in operation to produce a counter rudder action as soon as the aircraft receives an impulse from an exterior force, for example a squall, which would tend to throw it off its true course. Said counter steering action begins to act immediately to oppose said exterior disturbing force so that said exterior force is neutralized even before the aircraft can noticeably deviate from its true course.

The pressure produced in the precession bearings tends to turn the precession axis in the one or the other direction according to the direction of rotation of the gyroscope and the direction of the angular acceleration. The angular acceleration force or influence can therefore be rendered effective by means of a compensating control, for example by yieldingly journalling the precession axis which thus throws in a force that increases with the deviation of said axis from its true position, said force in turn acting upon the precession bearings in such manner as to tend to retain the precession bearings in their original position. If desired, in order to compensate the action of the pressure in the precession bearings, air or other fluid under pressure may be used, which flows from a restricted opening that is controlled by a controlling edge of the yieldingly movable precession bearing so as to allow more or less of an escape opening for the fluid. With such devices or others for the same purpose very strong and rapid variations in the compensating force, for example in the air or other fluid pressure, can be secured with an extremely slight displacement or adjustment of the controlling member, said compensating force constituting the measure for the bearing pressure and consequently for the angular acceleration and being transmittable in any suitable manner to act upon the power controlling means for the rudder operating motor or other steering means. Such compensating means are well known and need not be more fully described.

In the illustrative apparatus for carrying out the invention, a gyroscope is used the precessional axis of which is journalled in a frame which in turn can turn about an axis which is at right angles to the axis of the gyroscope and to the latter's precessional axis. So long as the movements of said frame are relatively small the pressure exerted by said frame can for all practical purposes be considered as proportional to the pressure in the precessional bearings and therefore also proportional to the turning acceleration of the aircraft. In accordance with the invention therefore, the bearing frame for the precessional axis of the gyroscope, which frame is herein for convenience designated as the acceleration frame, is caused to act upon the power controlling means for the rudder actuating means, whereby the desired action of the acceleration of rotation or turning acceleration of the aircraft is caused to act upon the steering. This provides a very simple way of deriving from the same gyroscope both the impulse dependent upon the turning speed and the impulse dependent on the turning acceleration, so that it is unnecessary to provide a separate means or instrumentality for the derivation of the latter impulse. Preferably for this purpose the precessional frame will be caused to act through resilient means, a spring for example, upon the power-controlling means for the rudder motor or other operating means. As a result of such a resilient connection between the precessional frame and the power-controlling means, said precessional frame will continue to vary its movement so long as the turning speed continues variable and will not come to rest until by the establishment of a state of equilibrium between the precessional force and the resilient restraining force the turning speed has become uniform and therefore the turning acceleration has been reduced to zero.

The invention also offers the further advantage that by the simplest means rotary movements about another axis can also be caused to act upon the steering or control. For example in automatic steering upon a predetermined course, the steering as is well known will be disturbed by transverse inclination of the aircraft. If however, the axis of the acceleration frame be adjustable then movements of the aircraft about its transverse axis will produce movements of said precessional frame corresponding to the turning speed about the longitudinal axis and movements of the acceleration frame corresponding to the speed of turning about said longitudinal axis. Of the total action of both frames, that part corresponding to the speed or the acceleration of the turning movement about the upright axis of the aircraft will be proportional to the cosine of the angle of inclination of the axis of the acceleration frame relative to said upright axis, while that part of the action exerted by the gyroscope corresponding to the speed or acceleration of the turning movement about the longitudinal axis of the aircraft, corresponds to the sine of said angle. The invention, therefore, enables all coarse steering determining influences to be caused to act in the simplest manner upon the rudder or other steering.

Referring to the figures in which is shown an illustrative apparatus for carrying out the invention, power-controlling means herein comprising a jet pipe 1 is provided, said jet pipe being mounted for swinging movement about the axis of a vertical pipe 2 which supplies any suitable pressure medium such as compressed air or liquid to said jet pipe. In front of the discharge opening of said jet pipe and in its plane of oscillation are provided two intake ports 3 and 4 which communicate through suitable pipes with the opposite ends respectively of a cylinder 7 divided into two chambers 5 and 6 by a piston 8 movable therein. Said piston is connected in any suitable manner to a rudder as by rod 9 and traction chains for example, similar to those disclosed in the patent to Möller, No. 1,900,516, of March 7, 1933. Controlling means is provided herein conveniently constituted by a gyroscope 10 preferably of the constrained type, having its horizontal axis 11 journalled in a precessional frame 12 which in turn has its precessional axis 13 journalled in the acceleration frame 14. The axis 16 of said acceleration frame 14 is journalled in a frame 15, said axis 16 being parallel to the upright axis of the aircraft. The axis 18 of the frame 15 is mounted in bearings provided in brackets 17 rigidly connected to the body or fuselage of the aircraft. Said frame is rotatable about said axis 18 and is provided with a stud 20 extending through a segmental slot 21 provided in one of the brackets 17, said stud 20 having screw threaded connection with a clamping nut 19 whereby said frame 15 may be adjusted and clamped in various angular positions. The inclination of the axis 16 relative to the upright axis of the aircraft can be read off on a scale 22 by means of an index 23 secured to said frame 15 in position to play over said scale. Upon the ends of the precessional axis 13 are mounted for free rotation brackets 24 in which are secured the ends of a member 25 curved in the arc of a circle and guided in a support 26 connected with the jet pipe 1. Referring to Fig. 5, it will be seen that the support 26 enables the frame 15 for the acceleration frame 14 to be inclined about its axis 18 in both directions at fixed angles. Brackets 24 are connected with the precessional frame 12 by a spring 28 the tension of which may be adjusted by screw 27.

If the frame 15 be swung into an oblique or inclined position as indicated in broken lines in Fig. 1, the gyroscope will precess when the aircraft executes a turning movement about its upright axis as well as when it executes a turning movement about its longitudinal axis. The impulse or influence transmitted to said jet nozzle and therefore to the lateral steering mechanism, if the angle of inclination of the precessional axis relative to the axis of inclination be designated with $\alpha$, will be proportional to $\cos \alpha$ in the case of turning movements about the upright axis and proportional to $\sin \alpha$ in the case of turning movements about the longitudinal axis of the aircraft. By adjustment at a certain angle the speed of the turning movement about the longitudinal axis may be made to act with the desired strength upon the lateral control. In incorporating apparatus embodying the present invention in an aircraft, it is therefore possible, for example, to determine by tests the most favorable position for the longitudinal axis in which the impulse or influence resulting from the transverse inclination of the aircraft and affecting the lateral control will be completely neutralized or as completely neutralized as is any way possible.

Adjustability of the impulse on the lateral control resulting from the speed of turning movement about the longitudinal axis of the aircraft may also be secured in accordance with the invention by the use of very simple means if a separate gyroscope or other means acting responsive to the speed of turning movement about the longitudinal axis of the aircraft be used. Furthermore the impulse to be exerted on the lateral control need not necessarily act on the rudder for lateral steering but may act upon any other suitable device used for influencing or correcting the lateral control or steering.

When the precessional frame 12 of the gyroscope makes a precessional movement responsive to a turning movement of the aircraft about its upright axis, spring 28 will be tensioned, and the greater said precessional movement is, the greater will be the tension of said spring. A force proportional to the speed of turning will therefore be caused to act upon the jet pipe 1 through spring 28, member 25 and support 26. It will be noted, however, that the jet pipe 1 is also connected to the acceleration frame 14 by a member 29 also formed in the arc of a circle which is guided in a bore provided in a lever 30 connected to said jet pipe.

Preferably also means are provided for exerting upon said jet pipe a force proportional to the angular deviation of the aircraft from the true course. Said means may conveniently comprise a diaphragm chamber 31 containing a diaphragm 32 which is subjected to a pressure differential controlled by a compass arrangement and exerts a deviating or adjusting force upon said jet pipe 1 corresponding to the deviation of the aircraft from the true course, said force being preferably exerted through a spring 33. Such a diaphragm chamber and compass arrangement may be similar to that disclosed in the above referred to Möller Patent No. 1,900,516 to which reference may be had for a more detailed description thereof. Preferably also said jet pipe 1 will be subjected to a return force. This may be exerted by any suitable means, for example by a spring 36 connected at one end to said jet pipe and having its other end engaged between two studs upon a lever 35 pivoted at 37 to a fixed part of the apparatus and having one end connected, preferably by a flexible connection 34 to the piston rod 9 and its other end connected by a spring 38 to a fixed part of the apparatus 39. It will be apparent that said spring 36 will be more or less tensioned by movement of the piston 8 and that said tension will exert the return force or influence upon said jet pipe.

The operation is briefly as follows:

If from any cause the aircraft makes a turning movement about its upright axis, said gyroscope frame 12 will execute a precessional movement about the precessional axis 13. The spring 28 thus tensioned, tends to turn the member 25 and thus exerts upon the latter a force proportional to said precessional movement and hence proportional to the speed of the turning movement executed by the aircraft, said force being transmitted to said jet pipe 1 through said support 26. When said gyroscope frame executes a precessional movement however, there is produced in the bearings of the precessional axis 13 a pressure proportional to the speed of said precessional movement and consequently proportional to the acceleration of the turning movement of the aircraft about its upright axis and which tends to turn said acceleration frame 14 about its axis 16. As the frame 16 is positively connected to the jet pipe 1 by the member 29 and the lever 30, said frame 14 can respond only by very small deviations or movements. Said frame 14, however, acting through said member 29 and the lever 30 exerts upon said jet pipe a deviating or adjusting force proportional to the pressure in the precessional bearings and hence proportional to the acceleration of the turning movement of the aircraft. Through the diaphragm chamber 31, diaphgram 32 and spring 33, there will be exerted upon said jet pipe 1 a force dependent upon the angle of deviation and finally by spring 36 there will be exerted upon said jet pipe 1 a return force proportional to the movement of the rudder itself.

In accordance with the invention therefore, there can be caused to act upon said jet pipe, first a force or impulse dependent upon the turning or angular acceleration; second, a force or impulse dependent upon the turning or angular speed; third, a force or impulse dependent upon the angular deviation; and fourth, a return impulse dependent upon the position or adjustment of the rudder.

By suitably combining these impulses a combined action is secured so that the rudder in accordance with our novel automatic steering is operated in exactly the same manner as it would be by an experienced pilot controlling or steering by hand, who not only sets his rudder in accordance with the deviations from the true course indicated by the compass, but also controls the rudder by taking into consideration the angular speed and angular acceleration.

As already stated the frame 15 in which is journalled the axis 16 of the acceleration frame 14 can be inclined about the axis 18 which is parallel to the transverse axis of the aircraft. If by means of this arrangement the axis 16 be inclined at a certain angle about the upright axis of the aircraft, then the precession force which becomes operative upon turning movement of the aircraft about its longitudinal axis, will no longer be completely taken up by the precessional bearings of the precessional frame 12 but will effect a precessional movement of the gyroscope by means of a component which is proportional to the sine of the angle of inclination, while on the other hand, upon turning movement of the aircraft about its upright axis, the entire precessional impulse can no longer manifest itself in a precessional movement, but only as a component corresponding to the cosine of said angle of inclination. The same applies to the bearing pressure produced in the bearings of the precessional axis 13 and which corresponds to the acceleration of the turning movement.

By suitably adjusting the inclination of the axis 16 it is therefore possible to cause the influences or forces resulting both from turning movement about its upright axis as also from inclinations about its longitudinal axis to act upon the rudder or other lateral steering means, and this both as regards the speed of the turning movement as also as regards the acceleration of the turning movement and in a ratio befitting the aerodynamic characteristics of the aircraft in question. The scale 22 makes it possible experimentally to select the correct adjustment of the axis 16 for each flight.

It will be apparent to those skilled in the art that our invention is applicable quite as advantageously to steering control about the transverse and longitudinal axes as well as about its vertical axis, that is to say the invention is not limited to course steering.

We are aware that our invention may be embodied in other specific forms without departing from the spirit or essential attributes thereof; and we therefore desire the present embodiment to be considered in all respects as illustrative and not restrictive, reference being had to the appended claims rather than to the foregoing description to indicate the scope of the invention.

We claim:

1. Apparatus for the automatic control of aircraft comprising, in combination, flight controlling means; actuating means therefor; a precessional gyroscope; a frame provided with bearings for the pivots about which said gyroscope precesses, said frame being rotatable about an axis at right angles to the axis of the gyroscope rotor and to the precessional axis of said gyroscope; and means intermediate said frame and said actuating means to transmit to said actuating means pressure created in said bearings by precession of said gyroscope.

2. Apparatus for the automatic control of aircraft comprising, in combination, flight controlling means; actuating means therefor; means to control said actuating means; a precessional gyroscope; a precessional frame in which the gyroscope rotor is journalled; a resilient connection between said frame and said actuating means controlling means to transmit to said last-named means a controlling impulse or force derived from and corresponding to the speed of turning movement of the aircraft about that axis relative to which the flight control is to be effected; a frame in which the precessional pivots of said gyroscope are journalled; and a positive connection between said last-named frame and said actuating means controlling means.

3. Apparatus for the automatic control of aircraft having in combination flight controlling means; actuating means therefor; controlling means for said actuating means comprising a precessional gyroscope the precessional axis of which is adjustable about an axis parallel to the axis of rotation of the gyroscope rotor; a frame provided with bearings in which the precessional pivots of said gyroscope are journalled; and a further frame in which said first-named frame is journalled, said further frame being inclinable about an axis parallel to said rotor axis.

4. Apparatus for the automatic control of aircraft, comprising, in combination, flight controlling means; operating means for the latter; controlling means for said operating means operating responsive to turning movement of said aircraft, and comprising a constrained gyroscope responsive to pressure created in the bearings thereof caused by said turning movement, to exert upon said operating means a controlling force proportional to the acceleration of said turning movement.

5. Apparatus for the automatic control of aircraft comprising, in combination, flight controlling means; fluid pressure actuated operating means therefor; fluid pressure supplying means comprising an adjustable jet pipe to supply fluid pressure to said operating means; controlling means operated responsive to angular deviation of said aircraft from its course to control the adjustment of said jet pipe to vary the fluid pressure supplied to said operating means proportionally to said angular deviation; and separate means responsive to turning movement of said aircraft to control the adjustment of said jet pipe to vary the fluid pressure supplied to said operating means proportionally on the one hand to the speed of said turning movement and on the other hand proportionally to the acceleration of said turning movement.

6. Apparatus for the automatic control of aircraft comprising, in combination, flight controlling means; fluid pressure actuated operating means therefor; fluid pressure supplying means comprising an adjustable jet pipe, to supply fluid pressure to said operating means; controlling means operated responsive to angular deviation of said aircraft from its course to control the adjustment of said jet pipe to vary the fluid pressure supplied to said operating means proportionally to said angular deviation; and a constrained gyroscope responsive to turning movement of the aircraft, to control the adjustment of said jet pipe to vary the fluid pressure supplied to said operating means proportionally on the one hand to the speed of said turning movement and on the other hand proportionally to the acceleration of said turning movement.

7. Apparatus for the automatic control of aircraft having, in combination, lateral steering means; operating mechanism therefor; and controlling means for said operating mechanism comprising a precessional gyroscope having two degrees of freedom and adapted to precess responsive and corresponding to the angular speed of the turning movement of the aircraft about its longitudinal axis, said gyroscope having the precessional axis in a plane parallel to said longitudinal axis and inclined at an angle to the latter.

8. Apparatus for the automatic control of aircraft having, in combination, lateral steering means; operating mechanism therefor; a relay to actuate said operating mechanism; and controlling means for said relay comprising a precessional gyroscope adapted to precess responsive and corresponding to the angular speed of the turning movement of said aircraft about its longitudinal axis, said gyroscope having the precessional axis in a plane parallel to said longitudinal axis and inclined at an angle to the latter.

9. Apparatus for the automatic control of aircraft having, in combination, lateral steering means; operating mechanism therefor; and controlling means for said operating mechanism comprising a precessional gyroscope adapted to precess responsive and corresponding to the angular speed of the turning movement of the aircraft about its longitudinal axis, said gyroscope having the precessional axis in a plane parallel to said longitudinal axis and inclined at an angle of 90° to the latter.

10. Apparatus for the automatic control of aircraft having, in combination, lateral steering means; operating mechanism therefor; and controlling means for said operating mechanism comprising a precessional gyroscope adapted to precess responsive and corresponding to the angular speed of the turning movement of the aircraft about its longitudinal axis, to exert a corrective force upon said operating mechanism, said gyroscope having the precessional axis in a plane parallel to the longitudinal axis of the aircraft and inclined at an angle to said longitudinal axis; and means to adjust the strength of said corrective force.

11. Apparatus for the automatic control of aircraft having, in combination, lateral steering means; operating mechanism therefor; and controlling means for said operating mechanism comprising a precessional gyroscope adapted to precess responsive and corresponding to turning movement of the aircraft about its upright axis, said gyroscope having its precessional axis in a plane parallel to said upright axis and to the longitudinal axis of the aircraft, said precessional axis being inclined, in said plane, at an angle to said upright axis.

12. Apparatus for the automatic control of aircraft having, in combination, lateral steering means; operating mechanism therefor; and controlling means for said operating mechanism comprising a precessional gyroscope adapted to precess responsive and corresponding to turning movement of the aircraft about its upright axis, said gyroscope having its precessional axis in a plane parallel to said upright axis and to the longitudinal axis of the aircraft, said precessional axis being inclined, in said plane, at an acute angle to said upright axis.

13. Apparatus for the automatic control of aircraft having, in combination, lateral steering means; operating mechanism therefor; controlling means for said operating mechanism comprising a precessional gyroscope adapted to precess responsive and corresponding to turning movement of the aircraft about its upright axis, said gyroscope having its precessional axis in plane parallel to said upright axis and to the longitudinal axis of the aircraft, said precessional axis being inclined, in a plane, at an angle to said upright axis; and means to adjust said angular inclination.

14. Apparatus for the automatic control of aircraft having, in combination, lateral steering means; operating mechanism therefor; controlling means for said operating mechanism comprising a precessional gyroscope adapted to precess responsive and corresponding to turning movement of the aircraft about its upright axis, said gyroscope having its precessional axis in plane parallel to said upright axis and to the longitudinal axis of said aircraft, said precessional axis being inclined at an angle to said upright axis; a precessional frame for said gyroscope; a second frame in which said precessional frame is journalled, said second frame being adjustable about an axis parallel to the transverse axis of the aircraft; and means to secure said second frame in adjusted position.

15. Apparatus for the automatic control of aircraft having, in combination, lateral steering means; operating mechanism therefor; controlling means for said operating mechanism comprising a precessional gyroscope adapted to precess responsive and corresponding to turning movement of the aircraft about its upright axis; said gyroscope having its precessional axis in plane parallel to said upright axis and to the longitudinal axis of said aircraft, said precessional axis being inclined at an angle to said upright axis; a precessional frame for said gyroscope; a second frame in which said precessional frame is journalled, said second frame being adjustable about an axis parallel to the transverse axis of the aircraft; a hand upon said second frame; a scale over which said hand plays when said second frame is adjusted; and means to secure said second frame in adjusted position.

16. Apparatus for the automatic control of aircraft having, in combination, lateral steering means; operating mechanism therefor; and controlling means for said operating mechanism comprising a precessional gyroscope having two degrees of freedom and adapted to precess responsive and corresponding to the angular movement of the aircraft about its upright axis and to the angular speed of the turning movement thereof about its longitudinal axis, said gyroscope having its precessional axis inclined at an angle to said longitudinal axis.

17. Apparatus for the automatic control of aircraft having, in combination, lateral steering means; operating mechanism therefor; and means acting responsive and corresponding to movement of the aircraft about its upright axis and to the angular speed of movement of the aircraft about its longitudinal axis to exert a corrective action upon said operating mechanism.

GUIDO WÜNSCH.
WALDEMAR MÖLLER.